Patented Feb. 4, 1936

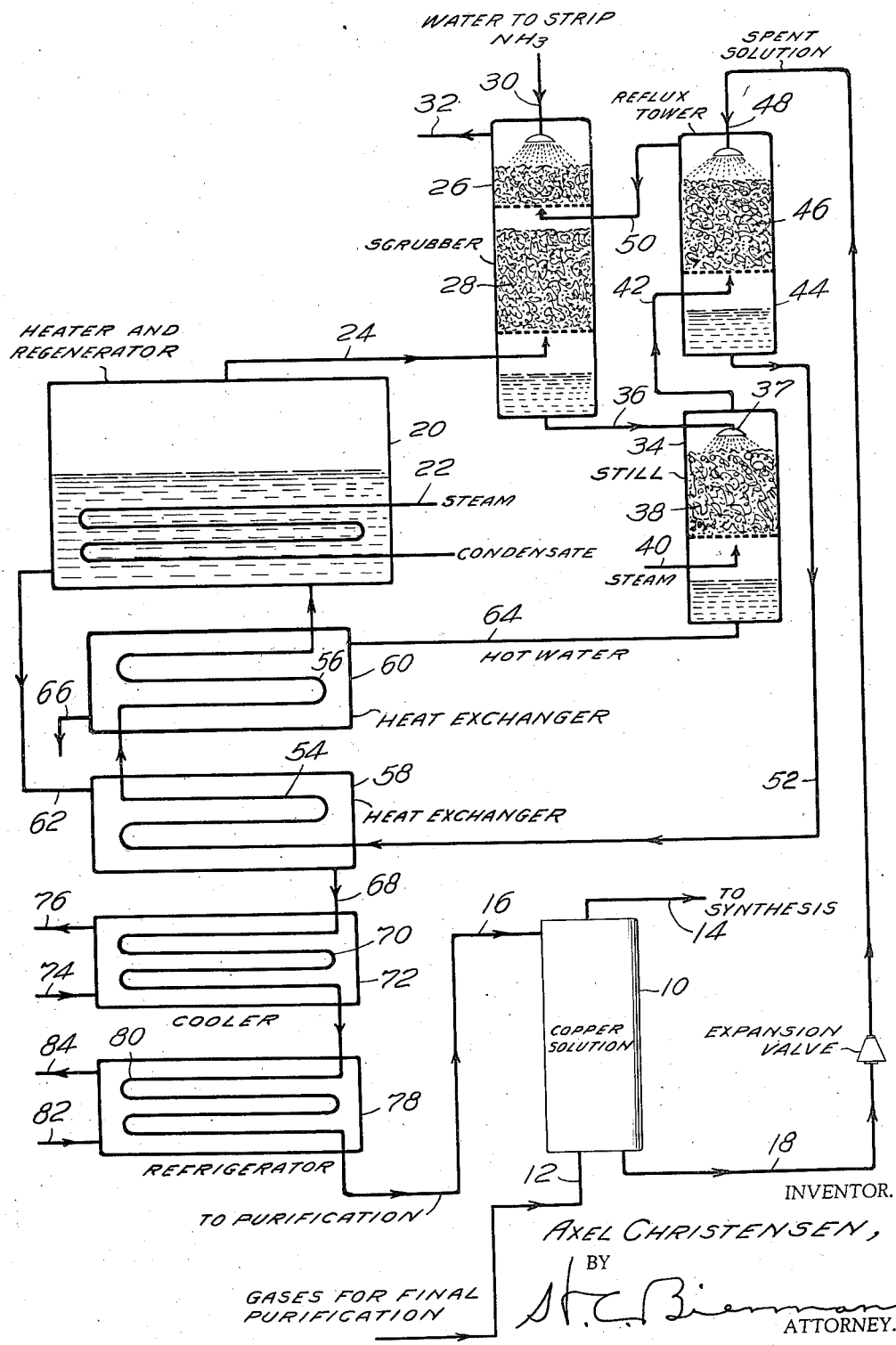

2,029,411

UNITED STATES PATENT OFFICE 2,029,411

METHOD OF REGENERATING ABSORBENT LIQUIDS

Axel Christensen, Rye, N. Y., assignor, by mesne assignments, to Chemical Construction Corporation, a corporation of Delaware Application January 12, 1933, Serial No. 651,337

4 Claims. (Cl. 23—7)

This invention relates to processes of and apparatus for purifying absorption media and it has particular relation to processes of purifying or regenerating liquors used for absorbing gases or vaporizable materials.

The main objects of the invention are—to provide an improved method of and apparatus for removing impurities from gases; to provide an improved method of and apparatus for returning to the solutions ammonia liberated in the regeneration of ammoniacal cuprous solutions employed in absorbing carbon monoxide and carbon dioxide; to reduce ammonia losses in the regeneration of ammoniacal cuprous solution to a minimum; to increase ammonia concentration in ammoniacal cuprous solution used for carbon monoxide and carbon dioxide absorption; to reduce carbon monoxide and carbon dioxide concentrations in the regenerated ammoniacal cuprous solution to a minimum; to enable relatively high temperatures to be used in removing carbon monoxide and carbon dioxide gases from ammoniacal cuprous solutions; to provide an apparatus for and a method of regenerating ammoniacal cuprous solutions used in absorbing carbon monoxide and carbon dioxide, the use of which results in relatively low heat requirements and maximum efficiency in the absorption of gases such as carbon monoxide and carbon dioxide from gases to be purified.

In such processes as that of fixing atmospheric nitrogen by the Haber process in accordance with prior art practice, hydrogen is generated by the action of steam and air upon a carbonaceous material and the hydrogen admixed with nitrogen is then passed under pressure through a suitable contact catalyst to effect chemical union between the hydrogen and nitrogen, thereby generating ammonia. In such process a mixture of nitrogen and hydrogen gas resulting from the reaction of the carbon and steam in the presence of air after reacting over a catalyst the carbon monoxide with steam to form more hydrogen and after scrubbing with water to remove the major portion of carbon dioxide, is found to contain gases such as carbon monoxide (2 to 4%), a lesser percentage of carbon dioxide and small amounts of oxygen. These gases are either poisons for the catalyst employed in the reaction of the hydrogen with the nitrogen or are otherwise objectionable in the process. It is customary to remove the carbon monoxide and dioxide by passing the mixture through a suitable medium such as a solution of cuprous ammonium salt containing free ammonia. This solution is an excellent medium for taking up carbon monoxide, dioxide and oxygen. Ammoniacal cuprous solutions react with and/or absorb objectionable gases in the raw mixture. On subsequent treatment according to known methods the solution may be freed from the gases which it has absorbed and may be reused. These properties are used in the purification of hydrogen and nitrogen mixtures for synthesis of ammonia by first washing the raw gases with the solution in a suitable scrubber tower under suitable conditions of temperature and pressure. When the solution has become charged with carbon monoxide, carbon dioxide and oxygen from the raw gases it is regenerated by subjecting it to an elevated temperature (around 70 or 80° C.) at substantially atmospheric pressures to expel the gases contained. At the same time some of the ammonia contained in the solution is driven off, and in these conventional systems it may be recovered by passing the mixture of expelled gases containing the ammonia through a scrubber tower where they are washed with the spent solution from the purification of the nitrogen-hydrogen mixture.

In such processes where the expelled gases from the spent solution are washed directly with spent solution there are certain disadvantages. For example, there is considerable loss of ammonia from the system due to the fact that all of the waste gases leave saturated with ammonia under the conditions obtaining where they are brought into contact with spent solution and recovery thereof in a form admitting of its return to the solution requires additional treatment. Also, in such conventional systems, all of the expelled carbon dioxide and monoxide which it is desired to eliminate from the spent liquors are again brought into contact with the spent solution and since the latter solution still contains considerable percentages of cuprous copper in the form of ammonium complexes there is a material reabsorption of the undesired gases along with the ammonia. These gases, of course, only increase the amount of work which must be performed in the regenerator towers or tanks and tend to increase the amount of gases which are carried in the solution even after regeneration. The more gases in the regenerated solution the less effective the latter will be in the purification of the hydrogen-nitrogen mixture used in the manufacture of ammonia. According to the provisions of this invention these difficulties are obviated or mitigated by washing the gases from the regenerator with water and then steam distilling the water to free the ammonia and admit of its absorption by the solution. If the washing with water is properly conducted, relatively little carbon dioxide and practically no carbon monoxide are taken up with the ammonia. Therefore, but little of these gases is brought into contact with the cuprous solution used to reabsorb the ammonia.

For a better understanding of the invention reference may now be made to the drawing in which the single view is a conventionalized diagram of one form of apparatus embodying the principles of the invention.

As shown in the drawing a tower or suitable absorption apparatus 10 is employed for scrubbing the mixture of hydrogen and nitrogen employed in the synthesis of ammonia. The raw gaseous mixture is supplied to the bottom thereof by means of a conduit 12 and the purified gases escape from the top through the conduit 14 and are conducted by the latter to further apparatus (not shown) for purifying and reacting the gases. Ammoniacal cuprous solution for absorbing objectionable carbon monoxide, oxygen and carbon dioxide is supplied to the top of the tower 10 by means of a conduit 16, which in the actual construction is provided with a conventional pump (not shown) for circulating the solution.

The solution after it has descended through the tower and taken up the objectionable gases from the mixture of raw gases is discharged from the bottom of tower 10 through a conduit 18 and is conveyed by the latter to the regenerating apparatus constituting the main feature of this invention. This regenerating apparatus includes a tank or container 20, which is provided with a conventional steam coil 22 or other suitable means for heating the solution contained in the tank for purposes of expelling the carbon monoxide and carbon dioxide. Simultaneously with the expulsion of these gases, considerable proportions of ammonia and steam are also driven off and the mixture is conducted through conduit 24 to a scrubber tower 26 and is released near the bottom of the latter to ascend through a conventional packing 28. There, wash water supplied by a conventional sprinkler 30 descends through this packing and functions to absorb the ammonia and condense the water vapor which is ascending in counter-current flow through the packing.

The carbon monoxide is practically not absorbed and accordingly passes upward through the tower and is discharged through a conduit 32 adjacent the top and is returned to the stream of raw gases employed in the manufacture of ammonia where it reacts with steam to produce additional hydrogen. The carbon dioxide present in part reacts with ammonia in the water. That which does not so react passes out with the carbon monoxide.

The water is warmed during its descent through the scrubber by contact with and/or absorption of the rising current of steam, ammonia and gases. By varying the quantity of water supplied to the scrubber, it is, therefore, possible to regulate the temperature of the ammoniacal solution leaving the scrubber through conduit 36. The maximum temperature is obtained with the minimum water required for complete absorption of all the ammonia from the gases but any lower temperature practically down to the temperature of the water supplied to the scrubber through the sprinkler 30 can be obtained.

The fresh wash water from the sprinkler 30 collects at the bottom of the tower 26 as an ammoniacal solution containing usually from 6 to 8% ammonia and also containing small amounts of carbon monoxide and carbon dioxide. This ammoniacal solution is discharged into a still 34 by means of a conduit 36 and sprinkler 37 and is there permitted to trickle downward through a packing 38 where it meets steam from a conduit 40 which further heats the solution and thus liberates the ammonia as well as the other gases absorbed in the solution. The mixture of vapors and gases is discharged through a conduit 42 into a reflux tower 44 which is packed with conventional packing 46 and in this packing it contacts with a spray of the spent solution supplied to sprayer apparatus 48 by the conduit 18 from the raw gas scrubbers. In this reflux tower most of the ammonia and water vapor is reabsorbed by the spent liquors and the heat of absorption results in an increase in temperature of the spent liquor in its passage through the tower. Any gases released from the spent solution together with that amount of ammonia gas which is in equilibrium with the released gases under the conditions prevailing, leave through conduit 50 and enter the scrubber 26 at a point intermediate the top and bottom of the packing 28 where the ammonia contained in the mixture of gases is subjected to absorption by the spray of water from the sprayer 30, and the carbon monoxide, hydrogen and other gases join the stream of those gases which is being discharged through the conduit 32. It is apparent that while it is convenient to return the ammonia to the spent liquor at the point in the system described, it may be introduced at other points, e. g. into the regenerated liquor, if so desired. Also the ammonia water in the still may be heated by steam coils or other convenient source of indirect heat.

The spent liquor from the reflux tower 44 discharges from the bottom of the latter through a conduit 52 and is conveyed by it to the heater and regenerator element 20 where the carbon monoxide and carbon dioxide are removed by heat.

For purposes of increasing the thermal efficiency of the apparatus the conduit 52 is provided with a pair of sets of coils 54 and 56 which respectively pass through heat exchange elements 58 and 60. The first mentioned element is directly connected by means of conduit 62 to the regenerator tank or container 20 to receive the regenerated liquor from the latter. Since this liquor is comparatively hot, it serves preliminarily to warm the spent liquor passing through the conduit 52 to the tank 20. The spent liquor is further heated in the exchanger 60 by reason of the fact that the latter is connected by means of the conduit 64 to the still tower 34 to receive the hot water stripped from ammonia after it has trickled through the packing 38. This water after it has given up its excess heat to the spent liquor in the coil 56 is discharged from the heat exchanger through a conduit 66.

The regenerated solution after removal of part of its heat in the heat exchanger 58 is discharged through a conduit 68 and passes through coils 70 in a cooler 72 having inlet and outlet conduits 74 and 76 for the entrance and exit of cooling water. It may pass into a second cooler or refrigerator 78 through coils 80 and the temperature is there further lowered by the action of ammonia or other refrigerant, flowing through inlet and exit conduits 82 and 84. Coil 80 is directly connected to conduit 16 which returns the regenerated solution to the scrubber tower 10.

The operation of the improved system is practically self-evident from the preceding description. The spent liquors which are charged with carbon monoxide, hydrogen, nitrogen and carbon dioxide are discharged from the tower 10 and are released in the form of a spray at the top of the reflux tower 44, where they encounter in their descent the ascending current of ammonia gas and steam and there they absorb the ammonia and steam which is given off from the spent liquor in the process of removing the carbon monoxide and carbon dioxide. The steam and ammonia, of course, are supplied to the reflux tower by the still tower 34 which serves to heat the water containing ammonia from the scrubber tower 26 thereby completely freeing it from ammonia. The ammonia is supplied to the latter tower from the regenerator tank 20.

Spent solution is supplied to the regenerator tank 20 from the reflux tower 44 where it is charged with the ammonia and steam released in the regenerator and in passing to the regenerator it is preliminarily heated in the heat exchanger 58 by means of the regenerated solution from the regenerator and also by means of the hot water from the still 34. During regeneration it is subjected to heating to a temperature of 70 to 80° C. more or less. Finally, the regenerated liquor is cooled in two stages in the cooler 72 and the refrigerator 78 and returned to the scrubber tower 10.

A considerable amount of water is evaporated from the solution during the heating in the regenerator 20 and is discharged as steam into the scrubber tower 26 where it is condensed and there may be a loss thereof as a result of discharge of some of it along with the wash water from the bottom of still 34.

In order to compensate for this loss of water and thus maintain a uniform concentration of the ammoniacal cuprous solution, it is desirable to add a certain amount of water to the solution.

In the system, as described above, this water can conveniently be added as steam from the still 34 to the spent solution in the reflux tower 44.

By varying the temperature of the ammonia solution entering the still through the sprinkler 37 and/or by varying the quantity of steam supplied to the still through conduit 40, the ratio of ammonia to steam in the gases leaving through conduit 42 can be varied and the lower the temperature of the solution and the smaller the steam quantity, the higher will be the proportion of ammonia.

The regulation of the amount of steam added to the spent solution preferably is accomplished as follows:

First:—Sufficient water is supplied to the scrubber 26 to completely remove the ammonia from the gases ascending through the scrubber.

Second:—Steam is supplied to the still 34 in sufficient quantity to completely strip the ammonia from the ammoniacal solution entering the still through sprinkler 37.

If it is now found, after the minimum amounts of water and steam required to obtain perfect recovery of the ammonia are being supplied to the scrubber and still respectively, that the ammoniacal cuprous solution loses water, then the steam quantity supplied to the still is increased until the correct amount of steam is carried with the ammonia to the reflux tower 44 and there added as water to the solution.

If, on the other hand, it is found that the ammoniacal cuprous solution gains in water, then the quantity of scrubbing water supplied to the scrubber is increased. This entails an increase in the amount of steam supplied to the still and these two operations are repeated until the correct amount of steam is going to the reflux tower and there condensed by the solution to water.

Reduction of solution may be corrected by adding oxygen. Normally it is not necessary to adjust the concentrations of water or ammonia in the solution by methods other than described above. If desired, however, ammonia or water may be added to the solution at any convenient point in the circuit.

The apparatus thus described is relatively simple in character and may be regulated quite readily. It is also characterized by the following facts:—

The gases liberated from the solution and leaving through conduit 32 are free from ammonia and can, therefore, without further treatment, be returned to the stream of raw gases employed in the manufacture of ammonia.

The gases liberated from the solution in regenerator 20 are not brought in direct contact with the spent solution, but the ammonia liberated during regeneration, which it is desirable to retain in the solution, is separated from the gases to be ultimately expelled from the regeneration system by absorption in water, thereby permitting its subsequent absorption in the solution, admixed with but small quantities of $CO_2$. This procedure favors low concentration of undesirable gases in the spent solution entering the regenerator which, in turn, favors more complete expulsion of undesirable gases from the solution during regeneration and thereby promotes gas absorption in scrubber 10.

The complete recovery of ammonia is greatly facilitated by the fact that water free from ammonia is used for scrubbing of the gases ascending through scrubber 26 for, since the concentration of the ammonia in this water at the top of the scrubber is zero, the scrubbing of the gases to remove ammonia is practically perfect in the upper zones of the packing 28. As the ammoniacal solution descending through the still 34 is at the boiling point in the lower section of the packing 38, practically all of the ammonia is expelled from the water leaving through conduit 64 and, therefore, no ammonia is lost from the system through conduit 66.

The construction as shown also assures high thermal efficiency of the system as a whole.

Although I have shown and described only a preferred embodiment of the invention, it is to be understood that numerous modifications may be made therein without departure from the spirit of the invention or the scope of the appended claims.

What I claim is:

1. A method of purifying ammoniacal cuprous solutions containing carbon monoxide and carbon dioxide, which comprises heating the solution thereby expelling the carbon monoxide and carbon dioxide together with some ammonia, scrubbing the mixture of gases while still hot, in counter flow with cold water to absorb the ammonia, permitting the carbon dioxide and carbon monoxide passing through the scrubbing water to escape, heating the scrubbing water to expel the ammonia, and reabsorbing the ammonia into the ammoniacal cuprous solution in which the gases and vapors from the heated scrubbing water, which are not absorbed by the ammoniacal cuprous solution, are returned to the gases and vapors undergoing scrubbing with water.

2. An apparatus for regenerating liquids employed for scrubbing gases which comprises a regenerating tank, a scrubbing tower for receiving gases from the tank, means for supplying scrubbing liquid to the tower and outlet means for the escape of non-absorbed gases from the tower, a still connected with the tower for receiving the wash liquid, means for heating the still, a reflux condenser connected to the still for receiving vapors and gases therefrom, means for supplying spent liquors to the reflux condenser, and means connecting the reflux condenser and the regenerating tank for supplying spent liquor thereto.

3. An apparatus as described in claim 2 in which the reflux condenser is directly connected to the scrubbing tower by means of a conduit.

4. An apparatus as described in claim 2 which is provided with a heat exchange element connected with the still for pre-heating the spent liquors as they flow to the regenerator tank.

AXEL CHRISTENSEN.